(12) United States Patent
Den Hartog et al.

(10) Patent No.: US 10,856,387 B2
(45) Date of Patent: Dec. 1, 2020

(54) CROWD ENTERTAINMENT

(71) Applicant: SIGNIFY HOLDING B.V., Eindhoven (NL)

(72) Inventors: Edith Danielle Den Hartog, Eindhoven (NL); Martijn Marius Hultermans, Eindhoven (NL); Johannes Petrus Wilhelmus Baaijens, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/327,464

(22) PCT Filed: Aug. 22, 2017

(86) PCT No.: PCT/EP2017/071092
§ 371 (c)(1),
(2) Date: Feb. 22, 2019

(87) PCT Pub. No.: WO2018/036996
PCT Pub. Date: Mar. 1, 2018

(65) Prior Publication Data
US 2019/0200436 A1    Jun. 27, 2019

(30) Foreign Application Priority Data

Aug. 23, 2016   (EP) ..................... 16185228

(51) Int. Cl.
*H05B 47/105*       (2020.01)
*G06K 9/00*         (2006.01)
*G10L 25/51*        (2013.01)

(52) U.S. Cl.
CPC ....... *H05B 47/105* (2020.01); *G06K 9/00778* (2013.01); *G10L 25/51* (2013.01)

(58) Field of Classification Search
CPC ............................ G06K 9/00778; G06N 5/02
See application file for complete search history.

(56) References Cited

U.S. PATENT DOCUMENTS

| 7,576,727 | B2 | 8/2009 | Bell |
| 8,195,598 | B2 | 6/2012 | Hua et al. |

(Continued)

FOREIGN PATENT DOCUMENTS

EP       2347809 A1    7/2011

*Primary Examiner* — Amy Cohen Johnson
*Assistant Examiner* — Jianzi Chen
(74) *Attorney, Agent, or Firm* — Meenakshy Chakravorty (57) ABSTRACT

A crowd entertainment system (100) is disclosed comprising a set of devices (110, 112) for generating an ambience observable from a crowd location (10), said ambience comprising at least one of a visual component and an audible component; and a controller (130) adapted to control said set of devices, the controller arranged to obtain data pertaining to a crowd behaviour parameter (131) indicative of the behaviour of a crowd in said crowd location from at least one crowd behaviour observation device and obtain the crowd behaviour parameter from said data; obtain a crowd composition parameter (133) indicative of a composition of said crowd from a crowd composition parameter source; select an ambience definition from a plurality of ambience definitions as a function of the obtained crowd behaviour parameter and crowd composition parameter, each of said ambience definitions being labelled with at least one particular crowd composition parameter; and control at least a subset of said set of devices in accordance with the selected ambience definition. An arena lighting system comprising such a crowd entertainment system, a computer-implemented method (200) of selecting an ambience for generation by a crowd entertainment system and a computer program product for implementing such a method are also disclosed.

15 Claims, 6 Drawing Sheets

(56) References Cited

U.S. PATENT DOCUMENTS

| | | |
|---|---|---|
| 8,860,843 B2 | 10/2014 | Mate et al. |
| 2006/0258457 A1 | 11/2006 | Brigham |
| 2009/0222388 A1* | 9/2009 | Hua .................... G06N 5/02 |
| | | 706/12 |
| 2012/0092167 A1* | 4/2012 | Hohl ................... G06F 3/017 |
| | | 340/573.1 |
| 2016/0224803 A1* | 8/2016 | Frank ............... G06F 16/24578 |

* cited by examiner

CROWD ENTERTAINMENT

CROSS-REFERENCE TO PRIOR APPLICATIONS

This application is the U.S. National Phase application under 35 U.S.C. § 371 of International Application No. PCT/EP2017/071092, filed on Aug. 22, 2017, which claims the benefit of European Patent Application No. 16185228.0, filed on Aug. 23, 2016. These applications are hereby incorporated by reference herein.

FIELD OF THE INVENTION

The present invention relates to a crowd entertainment system comprising a set of devices for generating an ambience observable from a crowd location, said ambience comprising at least one of a visual component and an audible component; and a controller adapted to control said set of devices in response to an obtained crowd behaviour parameter.

The present invention further relates to an arena lighting system including such a crowd entertainment system.

The present invention further relates to a computer-implemented method of selecting an ambience for generation by such a crowd entertainment system.

The present invention further relates to a computer program product for implementing such a method.

BACKGROUND OF THE INVENTION

Many events that are attended by crowds, e.g. sports events, concerts and the like, nowadays involve a form of crowd entertainment in addition to the attended event to enhance the mood and experience of the crowds. This is typically done by creating some form of ambience, i.e. an audible, visual or audio-visual effect, within the venue in which the event is hosted. Such effects for example may include a generation of a light show with a lighting system, projection of an image or video, music or the like, and so on, or combinations of such effects to create a multimedia ambience. Such ambience may be generated to reward certain types of behaviour of the crowd, e.g. Mexican waves, dancing or other types of positive behaviour, to control the mood within the venue and reduce the risk of crowd disturbances for instance.

In some cases, such ambiences are created in an ad hoc manner, e.g. by a producer of a televised broadcast of the event, who may obtain an indication of positive crowd behaviour, i.e. a positive crowd behaviour parameter, from a device capturing such behaviour, e.g. a CCTV system, a feed from a TV camera aimed at a section of the crowd, and so on, and who may decide to reinforce the positive behaviour by generating the ambience in a location within the venue such that it can be observed by this section of the crowd, e.g. showing the section of the crowd on a large screen within the venue, projecting light effects onto the section of the crowd, and so on.

Automated evaluation of crowd behaviour is also known. For example, U.S. 2009/0222388 A1 discloses a computer automated method of selectively identifying a user specified behaviour of a crowd. However, in such an automated approach it is not straightforward to establish the appropriate ambience to be generated in response to detection of a certain type of (positive) crowd behaviour. Generation of an inappropriate ambience in response to detecting crowd behaviour deserving of rewarding may prove counterproductive, and may lead to a deterioration of the mood of the crowd, which is undesirable.

SUMMARY OF THE INVENTION

The present invention seeks to provide a crowd entertainment system in which an ambience to be generated in response to the detection of certain types of crowd behaviour can be accurately selected in an automated manner.

The present invention further seeks to provide an arena lighting system including such a crowd entertainment system.

The present invention further seeks to provide a computer-implemented method of selecting an appropriate ambience for generation by such a crowd entertainment system.

The present invention further seeks to provide a computer program product for implementing such a method on such a crowd entertainment system.

According to an aspect, there is provided a crowd entertainment system comprising a set of devices for generating an ambience observable from a crowd location, said ambience comprising at least one of a visual component and an audible component; and a controller adapted to control said set of devices, the controller arranged to obtain data pertaining to a crowd behaviour parameter indicative of the behaviour of a crowd in said crowd location from at least one crowd behaviour observation device and obtain the crowd behaviour parameter from said data; obtain a crowd composition parameter indicative of a composition of said crowd from a crowd composition parameter source; select an ambience definition from a plurality of ambience definitions as a function of the obtained crowd behaviour parameter and crowd composition parameter, each of said ambience definitions being labelled with at least one particular crowd composition parameter; and control at least a subset of said set of devices in accordance with the selected ambience definition.

The present invention is based on the insight that an appropriate ambience for rewarding positive crowd behaviour may be reliably obtained by determination of the crowd composition and retrieving a definition, e.g. a set of control instructions, of an ambience to be generated, e.g. from a database or memory storing such ambiences, based on the determined crowd composition. Such a composition for example may be expressed as at least one of a demographic composition, e.g. the composition of the crowd in terms of age, team preference and/or gender and a geographic composition, e.g. the composition of the crowd in terms of where they live, which for example may serve as an indication of which team they support. Such a crowd composition parameter, e.g. identifier, may be obtained in real-time, e.g. by real-time evaluation of one or more images captured by a crowd composition parameter source in the form of one or more cameras, or may be obtained from a crowd composition parameter source in the form of a database or the like such as a ticketing database for the event the crowd is attending, a database originating from a mobile phone app, which database may comprise such demographic and/or geographic composition information, (also personal information may be included in such an app) in particular where tickets are tied to a fixed location within the venue, e.g. a sports arena or stadium.

In an embodiment, the controller is adapted to compare the obtained crowd behaviour parameter against a defined threshold, wherein the crowd behaviour parameter expresses a score for at least one of synchronicity of crowd movement and level and/or type of crowd vocalization; and select an ambience definition having a particular crowd composition parameter matching the obtained crowd composition parameter from the plurality of ambience definitions if the obtained crowd behaviour parameter exceeds the defined threshold. In this manner, it can be assured that only sufficiently positive crowd behaviour is rewarded with an ambience that is appropriate for the composition of the (section of the) crowd to be rewarded.

The crowd location may comprise a plurality of sections, e.g. different zones within a venue such as a (sports) arena, in which case the controller may be arranged to obtain data pertaining to a crowd behaviour parameter indicative of the behaviour of a crowd for each section; evaluate the crowd behaviour parameters for said respective sections to select one of said sections; and obtain a crowd composition parameter indicative of a composition of said crowd at least for the selected section, wherein the controller is adapted to select an ambience definition labelled with a particular crowd composition parameter matching the crowd composition parameter corresponding to the selected section from the plurality of ambience definitions.

To this end, the controller for example may be arranged to evaluate the crowd behaviour parameters for said respective sections by assigning a behavioural score to each of said sections and selecting the section having the highest behavioural score. Such a behavioural score may be a score for at least one of synchronicity of crowd movement and level and/or type of crowd vocalization. This ensures that only section(s) of the crowd whose behaviour is deserving of a 'reward' are presented with an appropriate ambience. This may have the additional advantage of several sections of the crowd competing with each other to have the ambience generated in response to their behaviour, which may improve the overall crowd behaviour within the venue.

The controller may be arranged to receive data pertaining to a plurality of individual behaviour parameters for each section, and calculate the crowd behaviour parameter for said section from the received plurality of individual behaviour parameters. For example, the controller may be arranged to calculate the crowd behaviour parameter based on a correlation between the received plurality of individual behaviour parameters. This ensures a particularly accurate determination of the crowd behaviour parameter, as it is based on the combination of the behavioural parameters of all individuals within the crowd.

Each section (of the crowd) may be associated with at least one device of said set of devices, such that the associated device(s) may be used to deliver the ambience to the location of the crowd. For example, such devices may include luminaires, projectors, loudspeakers, TV screens and the like for delivering the ambience to the section, or to a location observable from the section, such that each section can be treated to an appropriate ambience as a reward for positive crowd behaviour.

In some embodiments, the crowd entertainment system may receive crowd behaviour data, e.g. crowd behaviour parameters, from external capture devices, e.g. cameras, sensors, microphones and the like positioned within or around the venue in which the events take place. Such external devices for example may form part of crowd monitoring systems, e.g. CCTV systems, TV broadcasting systems, and so on. Alternatively, the crowd entertainment system itself may comprise at least one capture device adapted to communicate with the controller, said at least one capture device adapted to capture said data pertaining to the crowd behaviour parameter.

In an embodiment, the crowd entertainment system comprises a plurality of said capture devices, wherein each capture device is a wearable capture device for wearing by an individual in the crowd. In this manner, a crowd behaviour parameter may be accurately determined based on the combined data provided by the respective wearable capture devices.

According to another aspect, there is provided an arena lighting system comprising a plurality of luminaires and the crowd entertainment system of any of the herein described embodiments, wherein the controller is adapted to control said luminaires, at least some of the luminaires belonging to said set of devices. This further extends the functionality of such an arena lighting system, thereby increasing the (commercial) value of such an arena lighting system by providing the arena lighting system with crowd entertainment functionality.

According to yet another aspect, there is provided a computer-implemented method of selecting an ambience for generation by a crowd entertainment system comprising a set of devices for generating an ambience observable from a crowd location, said ambience comprising at least one of a visual component and an audible component; and a controller adapted to control said set of devices, the method comprising receiving, from said crowd entertainment system, data pertaining to a crowd behaviour parameter indicative of the behaviour of a crowd in said crowd location and obtaining the crowd behaviour parameter from said data; obtaining a crowd composition parameter indicative of a composition of said crowd; selecting an ambience definition from a plurality of ambience definitions as a function of the received crowd behaviour parameter and the obtained crowd composition parameter; and transmitting the selected ambience definition to the crowd entertainment system. Such a computer-implemented method for example may be provided as a remote service, e.g. as part as a ticketing service, a booking service or any other service having local knowledge of the crowd composition, which may be utilized in selecting the appropriate ambience for the crowd and transmitting this selected ambience definition to the crowd entertainment system for generating this ambience at the venue.

The method may further comprise comparing the obtained crowd behaviour parameter against a defined threshold, wherein the crowd behaviour parameter expresses a score for at least one of synchronicity of crowd movement and level and/or type of crowd vocalization; and selecting an ambience definition matching the obtained crowd composition parameter from the plurality of ambience definitions if the obtained crowd behaviour parameter exceeds the defined threshold to ensure that the ambience is only generated if the section of the crowd under observation is deserving of being subjected to the ambience.

In an embodiment, the crowd location comprises a plurality of sections, the method further comprising receiving, from said crowd entertainment system, data pertaining to a crowd behaviour parameter indicative of the behaviour of a crowd for each sections; evaluating the crowd behaviour parameters for said respective sections to select one of said sections; obtaining a crowd composition parameter indicative of a composition of said crowd at least for the selected section; and selecting said ambience definition from the plurality of ambience definitions as a function of the crowd behaviour parameter and the crowd composition parameter corresponding to the selected section in order to provide a selected section of the crowd with an appropriate ambience, as explained in more detail above.

In a further embodiment, receiving, from said crowd entertainment system, data pertaining to a crowd behaviour parameter indicative of the behaviour of a crowd in said crowd location comprises receiving data pertaining to a plurality of individual behaviour parameters from said crowd entertainment system, a combination of said individual behaviour parameters defining the crowd behaviour parameter; and calculating the crowd behaviour parameter from the received plurality of individual behaviour parameters in order to obtain a particularly accurate qualification of the crowd behaviour as previously explained.

According to still a further aspect, there is provided a computer program product comprising a computer readable storage medium having program instructions embodied therewith for, when executed by a processor of a computer system, cause the processor to implement the herein described embodiments of the computer-implemented method. Such a computer program product facilitates such a computer system to deliver an ambience to a crowd entertainment system tailored to a particular composition of the crowd to be subjected to this ambience as explained in more detail above.

BRIEF DESCRIPTION OF THE DRAWINGS

Embodiments of the invention are described in more detail and by way of non-limiting examples with reference to the accompanying drawings, wherein FIG. 1 schematically depicts a crowd entertainment system according to an embodiment.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

In the context of the present application, a crowd behaviour parameter is a parameter that quantifies a certain type of behaviour of a crowd. Such a crowd behaviour parameter may be derived from crowd observation data, for example data pertaining to the movement of the crowd and/or vocalization of the crowd. Such crowd observation data may be obtained using any suitable type of capture device, e.g. one or more cameras, microphones, motion sensors, and the like, or any suitable combination of such capture devices. The crowd behaviour parameter may be an expression of a degree of positivity of the crowd behaviour, e.g. of a defined scale such as a scale of 1-10 or another suitable numerical range. On such a scale, a low score may express negative crowd behaviour and increasing scores may express increasingly positive crowd behaviour. For example, in the case of movement of the crowd, a degree of synchronicity in the movement of the crowd may suggest positive crowd behaviour, e.g. dancing, participation in synchronized crowd movement such as a Mexican wave, and so on, whereas lack of such synchronicity may suggest negative crowd behaviour, e.g. random movements associated with aggressive behaviour such as fighting. Such synchronous behaviour may be determined in any suitable manner, for example by evaluation of a video stream produced by one or more cameras as capture devices in which movement of the crowd is captured in order to determine patterns of movement, i.e. synchronized movement, in the video stream, e.g. by object recognition, i.e. recognition of individuals within the video stream, and detection of correlation between movements of the respective objects in the video stream. Alternatively, each individual in the crowd may wear a wearable sensor including a motion sensor such as an accelerometer or a gyroscope, with the crowd behaviour being derived from the respective signals provided by the motion sensors in the wearable sensors, such that a synchronization in the individuals' movements may be derived from a correlation between these respective signals. As it is straightforward for the skilled person to evaluate video streams or motion sensor signals in this manner, this will not be explained in further detail for the sake of brevity only.

As another example, crowd vocalization such as volume of sound produced by a crowd, tone of sound produced by the crowd, certain types of phrases produced by the crowd, and so on, may be used to assign a crowd behaviour score to the crowd. For example, using microphones as capture devices a singing crowd may be distinguished from a shouting crowd, e.g. shouting profanities, whereas the volume of e.g. a singing crowd may be used to determine the overall fraction of the crowd participating in the singing. In this manner, e.g. by using suitable algorithms, a crowd behaviour parameter, e.g. a crowd behaviour score, may be assigned to the crowd based on the detected behaviour of the crowd with the one or more capture devices. As such voice evaluation algorithms are well-known per se, this will not be explained in further detail for the sake of brevity only.

As a further example, levels and types of crowd excitement may be used as a crowd behaviour parameter. The detection of excitement may be realized in several ways, such as via sound analysis, video analysis or wearable data analysis. Detection and analysis of sound(s) from the crowd is a straightforward technique where an increase in excitement generally results in an increase in sound levels. Video analysis may be used to detect for example people that are standing up or jumping. Excited people stand up and jump during sports events. In case of individuals (spectators) using wearables or a group of individuals (spectators) using one or more wearables, the data generated buy the wearable may be sent (e.g. via wireless communication) to a detection system and subsequently used to generate an ambience. The wearables may detect excitement levels from a set of bio-signals from the individuals, such as heart rate, breathing rates, galvanic skin response, sound, movements and gestures. Also synchronous hand clapping of groups of individuals can be detected as expression of excitement. This can be detected from comparing the time series data of all wearables and detect a certain synchrony in the data. Hand motions can be detected with smart watches that contain accelerometers, and similar movements create similar data of the accelerometers.

In the context of the present application, data pertaining to a crowd behaviour parameter may be data comprising the crowd behaviour parameter or may be data from which the crowd behaviour parameter may be calculated or otherwise obtained.

In the context of the present application, a crowd composition parameter is a parameter that quantifies a certain type of composition of a crowd. The composition of the crowd may refer to a demographic composition of the crowd or a geographic composition of the crowd. In case of a demographic composition, this for example may refer to a composition in terms or age and/or gender. In terms of a geographic composition, this for example may refer to the country or place of residence of the crowd or a sports individual or team supported by the crowd. Such crowd composition parameter may be determined in real-time, for example by evaluation of the data provided by the one or more capture devices for capturing the data from which the crowd behaviour parameter may be derived.

For example, the age, or gender of the crowd may be estimated by evaluation of one or more images captured of the crowd, e.g. using well-known face-recognition algorithms, which may be used to estimate such demographic parameters, e.g. the likely age bracket and/or gender of the recognized face, using any suitable decision engine such as a neural network or the like. Similarly, the geographic origins of the crowd may be determined in this manner from the style of clothing worn by individuals of the crowd, in particular clothing having a particular colour or colour combination, e.g. fan shirts or the like of a particular player or team supported by the crowd, which increases the likelihood that the crowd originates from the region where the player or team is based.

Alternatively, the crowd composition parameter may be obtained from a database storing crowd composition information, such as a database associated with a ticketing service, booking service or the like, where each individual in the crowd is associated with a particular crowd location, e.g. a particular seat in an arena or stadium, and where each individual has had to provide personal information, e.g. age or date of birth, gender, place of residence, and so on, which personal information may be used to derive the crowd composition parameter for a particular crowd composed of such individuals.

The crowd composition parameter may be obtained from data submitted by a plurality of mobile communication devices carried or worn by individuals in the crowd. Such data may comprise personal information of the individual carrying the mobile communication device, such that the crowd composition parameter may be derived from the personal information received from the plurality of mobile communication devices. Where the crowd composition parameter is associated with a particular section of the venue in which the crowd is located, location information may be obtained from each mobile communication device, e.g. GPS coordinates, signal strength information, time of flight information, and so on, to determine the location of the mobile communication device within the venue. A crowd composition parameter may be conditionally derived from such mobile communication device data, for example may be derived once a sufficient number of such data communications have been received to form a representative sample of the crowd. This may be achieved by comparing the number of data applications against a defined threshold, for example a threshold based on a known number of individuals in the crowd or in a particular section of the crowd. Such mobile communication data may be compiled into a database from which the crowd composition parameter may be obtained, e.g. derived.

According to the Merriam-Webster dictionary, an ambience is a feeling or mood associated with a particular location and is a synonym for an atmosphere of that location.

In the context of the present application, an ambience is created using a visual, audible or audio-visual effect or set of effects. Non-limiting examples of such ambience effects include projection of an image or video on a surface or structure, e.g. a grandstand or wall of an arena, a projection screen, a TV screen, or the like, light effects projected onto the crowd or in a location observable by a crowd, such as a sequence of colours, a strobe effect, and so on, music or the like played to the crowd over one or more loudspeakers, and combinations of such effects. Further examples include illuminating or highlighting (parts of) a sports event on the playing field observed by the crowd, illuminating the spectators in the crowd (possibly distinguishing between the different sections in the arena, for example, the sections hosting visitors wearing wearables that are operatively connected to the crowd entertainment system), illuminating external parts of the arena such as the roof of the grandstand to expand the ambience inside the arena, light effects at the sports field created using embedded lighting in for example artificial grass or indoor vinyl sports floors). Each ambience may be defined by an ambience definition, which may comprise a set of instructions for a selection of devices for generating such audible, visual or audiovisual effects, e.g. one or more loudspeakers, luminaires, projectors, TV apparatuses, and so on, or alternatively such an ambience definition may be an identifier for selecting such a set of instructions from a data storage device such as a memory, database or the like, storing sets of such instructions individually identifiable by respective ambience definitions.

In at least some embodiments, each ambience definition is labelled with metadata including at least one particular crowd composition parameter such that an ambience definition may be selected for a particular crowd based on the one or more crowd composition parameters defining the composition of the particular crowd, e.g. by selecting an ambience definition that has at least one crowd composition parameter in common with the particular crowd. In an embodiment, the selection of an ambience definition may include selecting the ambience definition having most crowd composition parameters in common with the particular crowd.

In at least some embodiments, the respective ambience definitions including the associated metadata may be user-defined. For example, the respective ambience definitions may be generated in response to research, e.g. survey results or the like, based on which particular ambience preferences for particular crowd compositions may be obtained. For example, a predominantly young crowd may have a preference for certain types of visual, audible or audiovisual effects, whereas a predominantly middle-aged crowd may have a preference for different types of visual, audible or audiovisual effects. In other scenarios, the user may be able to predict what type of ambience may be appreciated by a crowd of a particular composition; for example, where a crowd has a particular geographical composition, e.g. a crowd predominantly originating from a particular place of residence or predominantly supporting a particular athlete or sports team, and so on. In such a scenario, it may be predicted without research what particular ambience will be appreciated by such a crowd, e.g. visual effects in the team colours of the sports team supported by the crowd, audible effects such as music originating from the place of residence or associated with a particular sports team, and so on.

In the context of the present invention, an arena may be any type of venue in which a crowd may gather to attend an event. An arena may be an indoor venue or an outdoor venue, and is intended to include venues such as a stadium, e.g. a sports stadium, a velodrome, a swimming pool, a basketball or baseball stadium, and so on.

Fans of playing teams may play an important role in the way the crowd entertainment system is triggered, operates and interacts with the crowd. They play an important role in their own fan experience as they can trigger/interact with for example the venues' lighting system to generate an particular ambience. That is, the fans have a certain "power" on venue ambience. For example:

- More active fans may generate more spectacular light effects: When group A claps and/or sings in a certain way/rhythm a dedicated light effect is triggered. When group B copies this clapping behavior, the light effects may increase. Fans could be notified before or during the game on e.g. a mobile device about how they can trigger an specific ambience.
- More difficult clapping/singing may generate more spectacular light effects: Thresholds can be integrated in the crowd entertainment system, meaning that when group A starts with a simple clapping rhythm, a simple light effect is triggered e.g. one color, little intensity. Whenever group A starts increasing the clapping difficulty, a more spectacular light effect will be triggered.
- Unlock a mystery effect: A light effect may be enhanced by another effect e.g. a sound, smell, confetti effect. For example when a group increases the clapping rhythm, or when e.g. body movement and signing is included in their behavior.

It may be important to keep the crowd motivated to trigger a certain ambience and have them rewarded for their collective effort. E.g. when it is notified that e.g. group A has difficulties to clap synchronically, e.g. in order to trigger a light effect, the light effect can be applied, observable to group A, for some seconds (to facilitate synchronous clapping of the group) and then fade away again. When this is unsuccessful, the crowd entertainment system may change a threshold level (e.g. a synchronicity level of clapping) in such way that the crowd is still able to trigger the ambience.

A crowd entertainment system and method may further comprises means for detecting events on the pitch of an arena, e.g. using the cameras for capturing sports action on the pitch for broadcasting purpose, and generate an ambience at the pitch or crowd area to enhance the excitement and/or experience of the event. For example, cameras may detect events on the playing field that may lead to a team scoring a goal (e.g. a penalty kick) or may detect the actual goal, upon which the crowd entertainment system may select and generate an ambience (e.g. light effects in the colors of the scoring team) to enhance the experience or increase the excitement level of the crowd. This further increases the immersive experience of the crowd.

Figure 1:
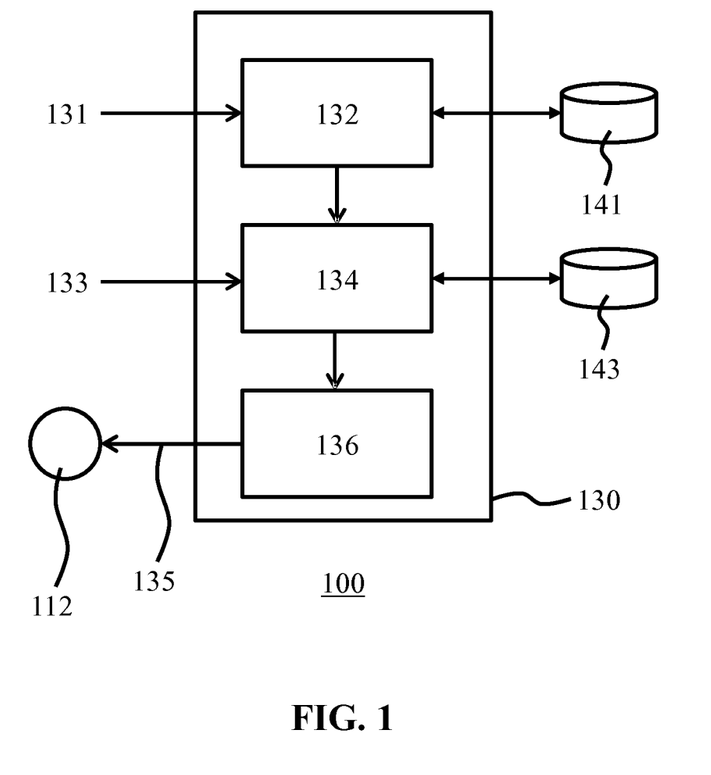

FIG. 1 schematically depicts an example embodiment of a crowd entertainment system 100 in which the system 100 comprises a controller 130 is configured to receive crowd behaviour information, e.g. a crowd behaviour parameter 131 and crowd composition information, e.g. a crowd composition parameter 133 from external sources. The controller 130 may be implemented as a dedicated controller, e.g. a dedicated processor arrangement including one or more dedicated processors of the crowd entertainment system 100 or as a general purpose processor arrangement comprising one or more general purpose processors, configured, e.g. using appropriate software, to implement the functionality of the controller 130 as described in more detail below.

The controller 130 may comprise a crowd behaviour evaluation module 132, which may be implemented as hardware, software or a combination thereof, which is adapted to obtain a crowd behaviour parameter indicative of the behaviour of a crowd in a particular crowd location, such as a section of a sports arena or the like in which the crowd is located. The crowd behaviour evaluation module 132 in this embodiment receives the crowd behaviour parameter from at least one external capture device (not shown) for capturing data from which the crowd behaviour parameter may be derived, e.g. one or more cameras, microphones, sensors such as motion sensors, and so on.

Figure 2:
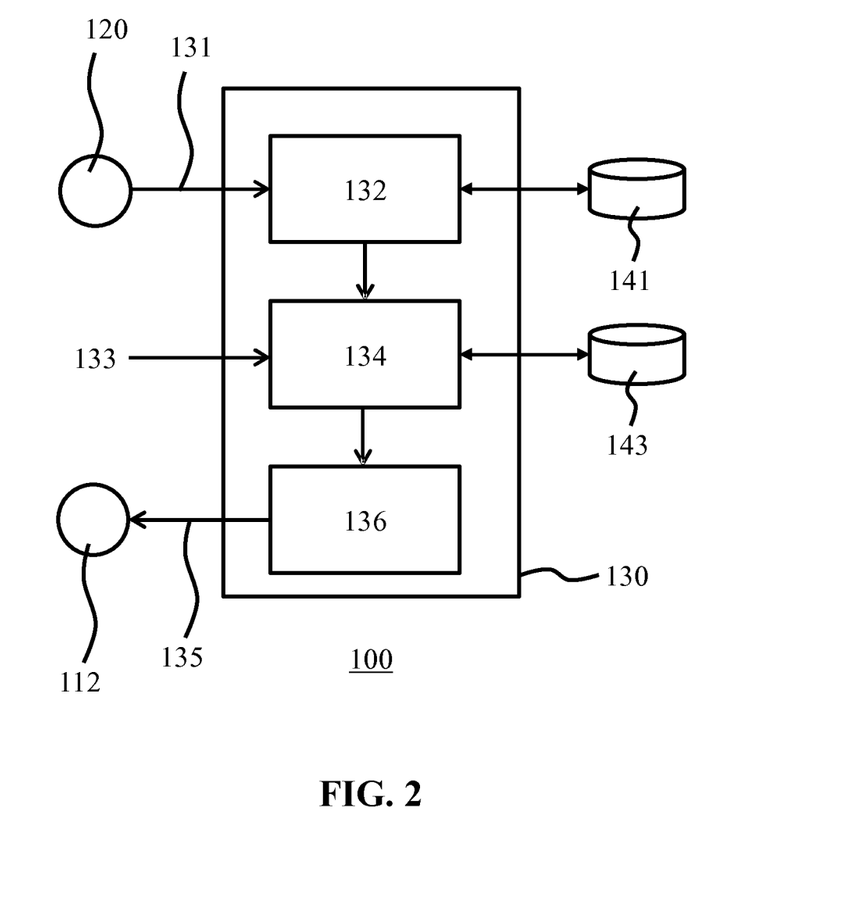
FIG. 2 schematically depicts a crowd entertainment system according to another embodiment.

Alternatively, as schematically depicted in FIG. 2, the crowd entertainment system 100 may further comprise one or more of such capture devices 120. Such capture devices may be adapted to communicate with the controller 130 in any suitable manner, e.g. over a wireless connection such as a WiFi connection, a Bluetooth connection, a mobile communication standard connection such as a 3G, 4G or 5G connection, a proprietary wireless connection and so on, in which case each of the capture devices and the controller 130 may further comprise a wireless communication module (not shown). Such modules are well-known per se and are therefore not explained in further detail for the sake of brevity only. The capture devices instead may be adapted to communicate with the controller 130 over a wired communication channel, e.g. a P2P connection, a communication bus and the like, using any suitable wired communication protocol, in which case each of the capture devices and the controller 130 may further comprise a wired communication module (not shown). Such modules are also well-known per se and are therefore not explained in further detail for the sake of brevity only.

The crowd behaviour evaluation module 132 may be adapted to receive the crowd behaviour parameter from an external capture device or from a capture device 120 or alternatively may be adapted to receive (raw) data from such capture devices and derive the crowd behaviour parameter from the received data. In an embodiment, the crowd behaviour evaluation module 132 is adapted to compare the received crowd signals from the one or more capture devices against a database 141 of such signals, each associated with a particular behavioral score. Such a comparison for example may be based on a well-known time series evaluation of the received signal with the database signal to establish whether the received signal matches the database signal although it should be understood that other or additional types of evaluation are equally feasible; for example, the amplitude, dynamics, frequency and so on of such signals may be evaluated in the process of obtaining the crowd behaviour parameter 131.

Such a database 141 may form part of the crowd entertainment system 100 or may be a remote database that may be accessed in any suitable manner, e.g. over a network connection such as the Internet, a VLAN connection, and so on. The crowd behaviour evaluation module 132 may be adapted to aggregate or average the scores retrieved for the respective signals received from the one or more capture devices, in order to obtain a crowd score, i.e. a crowd behaviour parameter 131 for the (section of the) crowd under observation. The crowd behaviour evaluation module 132 may be adapted to compare this crowd score against a defined threshold, e.g. in order to determine if the score is high enough to justify generation of an ambience to reward the crowd under observation for their behaviour.

In an alternative embodiment, the crowd behaviour evaluation module 132 is adapted to evaluate the signals received from the one or more capture devices to determine a correlation in crowd behaviour, e.g. a correlation in movement or vocalization of different individuals in the crowd.

Figure 3:
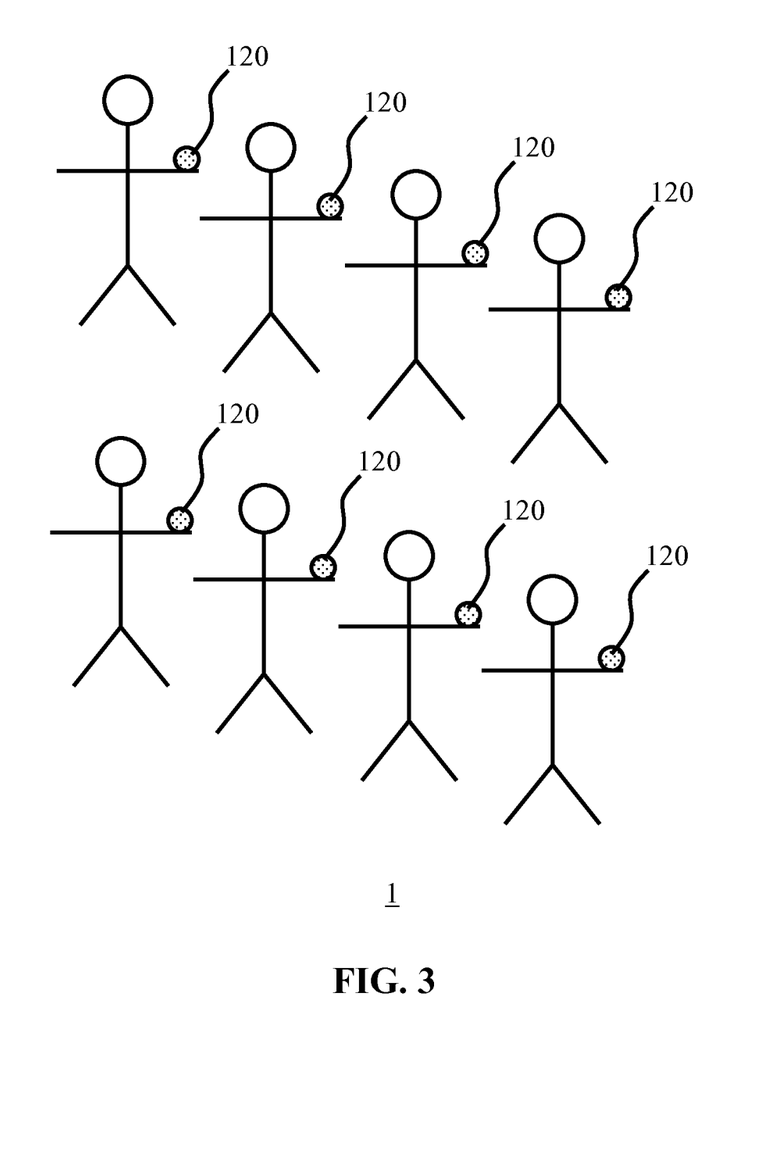
FIG. 3 schematically depicts an aspect of a crowd entertained system according to an embodiment.

For example, the crowd behaviour evaluation module 132 may be adapted to evaluate a stream of images, e.g. a video signal, from one or more cameras, or sensor signals from sensors associated with individuals in the crowd wearing such sensors, e.g. wearable sensors 120 as schematically depicted in FIG. 3, which wearable sensors may include at least one of one or more motion sensors and an audio sensor such as a microphone, to detect a degree of synchronization between movements or vocalizations of the individuals within the crowd under observation.

In case of a sequence of images or video signal, the crowd behaviour evaluation module 132 may be adapted to identify regions in the images or video corresponding to individuals within the crowd and monitor the movement of the identified regions to determine a degree of correlation between the movements, which degree of correlation may be translated into a crowd behaviour parameter such as a crowd behaviour score. This is based on the insight that positive crowd behaviour, such as dancing, synchronized motion such as a Mexican wave, etcetera, typically corresponds to movements of individuals in a highly correlated manner, i.e. individuals moving in substantially the same manner at the same time or with a time delay that is a function of the location of the individual within the crowd, whereas undesirable crowd behaviour such as fighting typically can be recognized from more chaotic or random individual movements, which may be associated with a lower crowd behaviour score.

Similarly, a crowd behaviour evaluation module 132 receiving a plurality of motion sensor signals, e.g. from wearable sensors 120 as schematically depicted in FIG. 3 including motion sensors, may derive such a correlation from evaluation of the respective motion sensor signals as will be immediately apparent to the skilled person. In the same manner, a crowd behaviour evaluation module 132 may evaluate vocalizations of a crowd, e.g. as obtained from one or more microphones aimed at the crowd, e.g. microphones in the wearable sensors 120 as schematically depicted in FIG. 3, and derive a degree of synchronization in these vocalizations from the audio signals received from these microphones. For example, a crowd singing the same song will result in a higher degree of synchronization compared to a crowd in which individuals are randomly shouting, which degree of synchronization may be translated into a crowd behaviour parameter such as a crowd behaviour score as previously explained.

The controller 130 further comprises a crowd composition determination module 134, which may be implemented as hardware, software or a combination thereof, which is adapted to obtain a crowd composition parameter indicative of the composition, e.g. demographic or geographic composition, of a crowd in the particular crowd location for which the crowd behaviour evaluation module 132 has obtained a crowd behaviour parameter, e.g. a crowd behaviour score. In an embodiment, the crowd composition determination module 134 is responsive to the crowd behaviour evaluation module 132. For example, the crowd composition determination module 134 may be activated by the crowd behaviour evaluation module 132 in case of the crowd behaviour evaluation module 132 determining that the evaluated crowd behaviour as expressed by the crowd evaluation behaviour parameter 131 warrants the generation of an ambience that is observable by the crowd whose behaviour has been evaluated, i.e. that can be observed by the crowd in the crowd location under observation. As previously explained, this may be an ambience generated in or around the crowd location, or may be an ambience projected onto one or more surfaces or a projection or TV screen that can be seen from this crowd location, which ambience may be supported by an audible component as previously explained, which audible component may be directed at the crowd location as will be readily understood by the skilled person.

The crowd composition determination module 134 is adapted to obtain at least one crowd composition parameter 133 and to select or cause the selection of an ambience corresponding to the obtained crowd composition parameter 133. As explained in more detail above, the crowd composition determination module 134 may be adapted to derive such crowd composition parameters 133 from one or more signals provided by the one or more capture devices 120 for determining the crowd behaviour parameter, e.g. by deployment of face recognition algorithms or the like to evaluate one or more images of the crowd. Alternatively, the crowd composition determination module 134 may request the one or more crowd composition parameters 133 from an external database (not shown) containing such information, e.g. a database associated with a ticketing or booking service or from personal information provided by mobile communication devices carried by the individuals in the crowd as previously explained. To this end, the crowd composition determination module 134 for example may provide such an external service with a crowd location identifier, e.g. a section of an arena or stadium in which the crowd under observation is located, with the external service returning the crowd composition parameter 133 as a response to this request, e.g. by retrieving the one or more crowd composition parameters 133 of the crowd in the location specified by the crowd location identifier.

Upon obtaining one or more crowd composition parameters 133 defining the composition of the crowd under observation, the crowd composition determination module 134 may access a database 143 storing a plurality of ambience definitions, with each of these definitions being tagged or labeled with metadata comprising one or more crowd composition parameters. The database 143 may form part of the crowd entertainment system 100 or may be a remote database accessible by the crowd composition determination module 134 in any suitable manner, e.g. over a network connection such as a VLAN or the Internet, a mobile communications network, and so on. The crowd composition determination module 134 may search or request a search of the database 143 to find an ambience definition in the database 143 having at least one crowd composition parameter matching the crowd composition parameter corresponding to the crowd under observation.

Where such a search reveals a plurality of ambience definitions having matching crowd composition parameters, further criteria may be used to narrow the search results down to a single ambience definition. For example, the crowd composition determination module 134 may assign a weighting factor to each of the crowd composition parameters of the crowd under observation, which weighting factors may be used to find the most appropriate ambience definition in the database 143. In another example, the search results may be narrowed down by selecting the ambient definition sharing the most crowd composition parameters with the crowd under observation. Many other suitable selection criteria will be apparent to the skilled person.

In some embodiments, the database 143 may return all ambience definitions sharing a crowd composition parameter with the crowd under observation such that the crowd entertainment system 100 may generate a sequence of ambiences, to further enhance the crowd experience in the venue.

The controller 130 may further comprise a control module 136 adapted to control a set of devices 112 for generating the ambience 135 corresponding to the selected ambience definitions, which ambience is observable from the location of the crowd under observation. The control module 136 may receive the selected ambience definitions from the crowd composition determination module 134 and select the one or more devices 112 in the set for generating the corresponding ambience, e.g. based on control instructions corresponding to the selected ambience definition. As previously explained, the one or more devices 112 may include devices for generating a visible output, an audible output or an audio-visual output, such as luminaires, projectors, projection screens, TV screens, loudspeakers, and so on.

At this point, it is noted that although in the foregoing reference is made to separate modules 132, 134, 136, it should be understood that these modules may not exist as separate entities but equally may be separate functions operated by the same entity, e.g. a processor arrangement configured to implement such functions.

Figure 4:
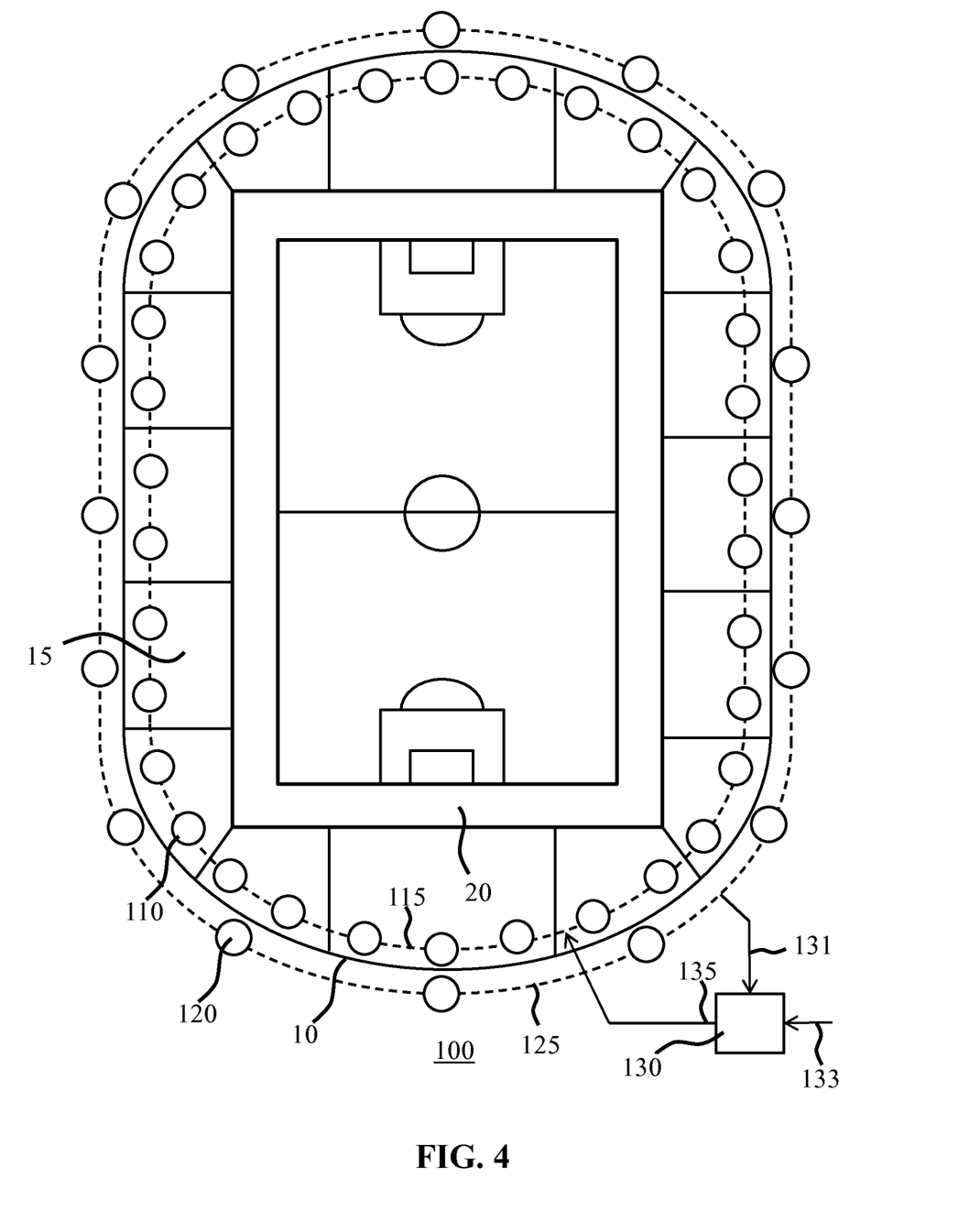
FIG. 4 schematically depicts an arena lighting system adapted as a crowd entertainment system according to an embodiment.

FIG. 4 schematically depicts an embodiment of such a crowd entertainment system 100 forming part of an arena lighting system, e.g. a stadium lighting system. Such a lighting system may be installed in an indoor or outdoor arena 10, e.g. a sports venue such as a stadium, a concert hall, and so on, which arena 10 may be compartmentalized in a plurality of sections 15, e.g. to segregate different sections of the crowd. Such sections 15 may be located at least partially around a performance area 20, a sports pitch, pool, velodrome, stage, and so on, and may be arranged at different (horizontal) levels, i.e. tiers, as is well-known per se.

The lighting system including the crowd entertainment system 100 comprises a plurality of luminaires 110 for mounting relative to the performance area 20 such that the luminaires 110 can be aimed at the performance area 20 in order to generate a predefined illumination pattern. For example, in case of a sports arena, the luminaires 110 may be mounted around the pitch in order to achieve the predefined illumination pattern. The luminaires 110 may be mounted in any suitable manner, e.g. in dedicated mounting frames to be positioned in selected positions of the sports arena, e.g. in proximity to corners of the pitch, in which case each mounting frame may include a mast for elevating the mounting frame to a desired height in order to achieve pitch illumination under suitable illumination angles. A particularly common alternative arrangement is where the luminaires 110 are mounted on e.g. the roofs of the stands and seating areas, i.e. the respective sections 15, around the pitch 20, wherein the luminaires 110 may be mounted on different tiers of the spectator areas to achieve pitch illumination under a range of illumination angles. This for instance is advantageous when trying to achieve uniform or homogeneous illumination of a pitch region under different viewing angles, e.g. from different camera positions for capturing sports action on the pitch for broadcasting purposes, where the illumination requirements may be more easily achieved when illuminating a pitch region from multiple illumination angles. The luminaires 110 may be any suitable type of luminaire, e.g. a LED-based luminaire such as a LED-based flood light or the like.

In an embodiment, at least some of the luminaires 110 also form part of the crowd entertainment system 100, i.e. are configurable to generate a visual ambience observable by a crowd in a particular section 15. The luminaires 110 may be communicatively coupled to the controller 130 through wired or wireless communication means 115, e.g. a wired or wireless bus structure or a plurality of dedicated wired or wireless communication channels between the controller 130 and the respective luminaires 110.

The lighting system including the crowd entertainment system 100 further comprises a plurality of capture devices 120 adapted to communicate with the controller 130, e.g. over a wired or wireless communications link as previously explained, to facilitate the controller 130 to obtain crowd behaviour parameters 131 from the data provided by the capture devices 120 over the communications link 125. Alternatively, at least some of the capture devices 120 may locally process this data and provide the controller 130 with the crowd behaviour parameter 131 derived from this data. In an embodiment, each section 15 is associated with at least one such capture device 120 such that the behaviour of the crowd in this section may be quantified using the data provided by the at least one such capture device 120. Any suitable capture device 120 or plurality of capture devices 120, e.g. wearable capture devices, as previously described may be used for this purpose.

In an embodiment, the controller 130 is adapted to receive or calculate a crowd behaviour parameter 131 indicative of the behaviour of a crowd for each section 15 from the one or more capture devices 120 associated with these respective sections. The controller for example may award a crowd behaviour score as previously explained to each of the sections 15 and, provided that at least some of the calculated crowd behaviour scores are high enough to warrant the generation of an appealing ambience, select the section 15 having the highest calculated crowd behaviour score for generation of an ambience sharing a crowd composition parameter with the crowd in the selected section. In an embodiment, the controller 130 may receive crowd composition parameters for each section 15 prior to performing the crowd behaviour analysis, such that an appropriate ambience may be selected and generated relatively quickly, which has the advantage that the crowd in the selected section 15 is more likely to appreciate the generated ambience being a reward for their behaviour. Alternatively, the controller 130 may only obtain the crowd composition parameter 133 for the selected section 15, e.g. by requesting the crowd composition parameter from a database as previously explained, to limit the amount of communication with such a database.

The controller may be adapted to calculate an aggregate crowd behaviour parameter 131 for each section 15, e.g. a crowd behaviour score, by combining, e.g. adding up several component scores. For example, in case of multiple sets of data, e.g. data pertaining to crowd movement, data pertaining to a certain type of crowd vocalization, and so on, each data set may be given an individual score, with the sum of the individual scores yielding the crowd behaviour score.

The selected section 15 of the crowd may be rewarded with any suitable ambience as previously explained. In the context of an arena lighting system, particular examples of such an ambience may include use of projections, e.g. art projections, on a grandstand of the selected section 15, projection of the colours of the athlete or sports team supported by the crowd in the selected section, e.g. on the grandstand of the selected section 15, illuminating only the selected section 15 whilst keeping the remaining sections in darkness, offer an audiovisual show to the selected section 15 during a break in the event, e.g. a sports match, and so on. Many other examples will be apparent to the skilled person.

Figure 5:
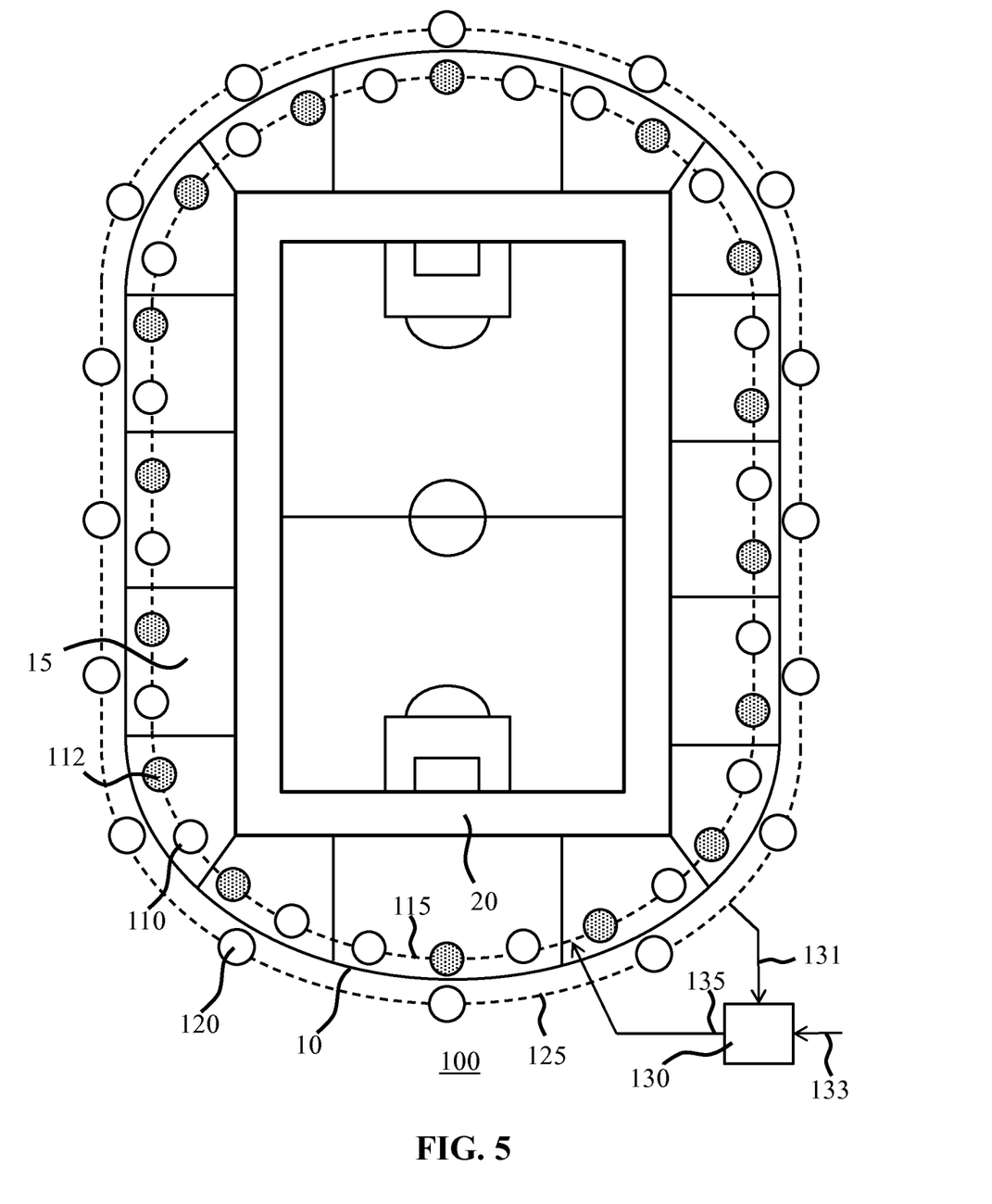
FIG. 5 schematically depicts an arena lighting system adapted as a crowd entertainment system according to another embodiment.

In order to deliver more elaborate ambiences, the arena lighting system in addition to luminaires 110 may comprise further devices 112 for generating a visual component and/or an audible component of such an ambience, as schematically depicted in FIG. 5. Such further devices 112 may be communicatively coupled to the controller 130 in any suitable manner, e.g. using wireless or wired communication links as previously explained. Any suitable device 112 may be contemplated; e.g. one or more projectors, projection screens, loudspeakers, and so on.

In the above embodiments, the controller 130 of the crowd entertainment system 100, e.g. when comprised by an arena lighting system, is adapted to locally process the data pertaining to the crowd behaviour parameters 131 and to obtain the crowd composition parameters 133. However, in an alternative embodiment, such processing may be provided by a remote service, i.e. a computer-implemented method on a remote computer system such as a network connected server, e.g. an Internet connected server hosting such a service. For example, the service may be remotely offered by the manufacturer of the crowd entertainment system 100.

Figure 6:
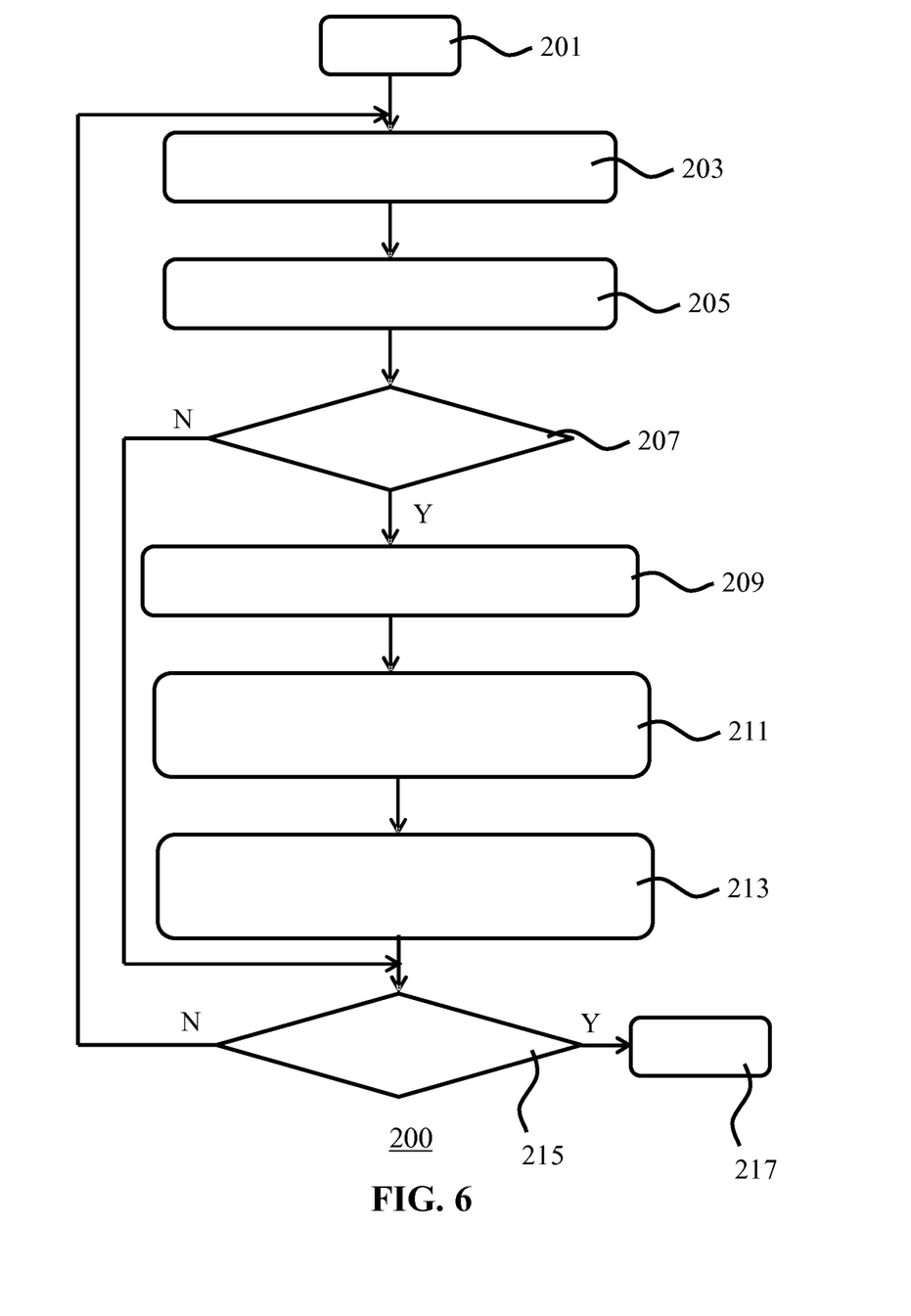
FIG. 6 is a flowchart of a computer-implemented method according to an embodiment.

FIG. 6 depicts a flow chart according to an example embodiment of such a computer-implemented method 200. In this example embodiment, the method 200 starts in 201, e.g. by launching the service on the computer system implementing the method, after which the method 200 proceeds to 203 in which the service receives the data pertaining to the one or more crowd behaviour parameters 131 from the crowd entertainment system 100 at the venue containing the crowd, e.g. an arena 10 as previously explained. In 205, the service may process the received data to obtain the one or more crowd behaviour parameters 131, which may further comprise an evaluation of the one or more crowd behaviour parameters 131, e.g. to rank the crowd behaviour parameters 131 for different sections 15 of the crowd in the venue as previously explained.

In 207, it may be checked if a particular crowd behaviour parameter 131, e.g. a highest-ranking crowd behaviour parameter 131 such as a highest crowd behaviour score exceeds a defined threshold, e.g. has a score that is high enough to warrant the generation of a particular ambience to be observed by the crowd corresponding to this particular crowd behaviour parameter 131. As previously explained, such a score for example may be based on at least one of synchronicity of crowd movement and level and/or type of crowd vocalization. If it is decided in 207 that no such ambience should be generated, the method 200 may proceed to 215 in which it is checked if the method 200 has completed, after which the method 200 may terminate in 217.

On the other hand, if it is decided in 207 that the particular crowd behaviour parameter 131 warrants the generation of an appropriate ambience, the method 200 proceeds to 209 in which one or more crowd composition parameters 133 for the crowd associated with the particular crowd behaviour parameter 131 are obtained, e.g. from data provided by the crowd entertainment system 100, which data may be the data pertaining to the crowd behaviour parameter 131, from a database associated with a ticketing or booking service for the venue or from personal information provided by mobile communication devices carried by the individuals in the crowd as previously explained in more detail above. Although not specifically shown, it should be understood that in an alternative embodiment, the service may obtain the crowd composition parameters for each section 15 of the venue at any suitable point in time, e.g. before or during evaluation of the data pertaining to the respective crowd behaviour parameters.

The method 200 may subsequently proceed to 211 in which the obtained one or more crowd composition parameters are used to select an appropriate ambience definition from a database storing a plurality of such ambience definitions, in which each ambience definition contains metadata including one or more crowd composition parameters. The appropriate ambience definition may be selected based on a match between the one or more crowd composition parameters associated with the crowd to be presented with the ambience and the crowd composition parameters in the metadata, as explained in more detail above. As previously explained, more than one ambience definition may be selected in this manner.

The selected ambience definition(s) are transmitted in 213 to the controller 130 of the crowd entertainment system 100 for generation of the one or more ambiences in accordance with the selected ambience definition(s) at the venue where the crowd is located, after which the method 200 may proceed to 215 to check if the method may be terminated in 217. If it is decided in 215 that the method 200 is to continue, the method 200 may refer back to 203; otherwise, the method 200 may terminate in 217.

Aspects of the present invention may be embodied as a crowd entertainment system 100, an arena lighting system including such a crowd entertainment system and a method 200 or computer program product for providing such a crowd entertainment system with an ambience definition. Aspects of the present invention may take the form of a computer program product embodied in one or more computer-readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Such a system, apparatus or device may be accessible over any suitable network connection; for instance, the system, apparatus or device may be accessible over a network for retrieval of the computer readable program code over the network. Such a network may for instance be the Internet, a mobile communications network or the like.

More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present application, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out the methods of the present invention by execution on a processor of a computer system may be written in any combination of one or more programming languages, including an object oriented programming language such as Java, Smalltalk, C++ or the like and conventional procedural programming languages, such as the "C" programming language or similar programming languages. The program code may execute entirely on the processor as a stand-alone software package, e.g. an app, or may be executed partly on the processor and partly on a remote server. In the latter scenario, the remote server may be connected to the processor through any type of network, including a local area network (LAN) or a wide area network (WAN), or the connection may be made to an external computer, e.g. through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions to be executed in whole or in part on the processor of a computer system, such that the instructions create means for implementing the functions/acts specified in the flowchart and/or block diagram block or blocks. These computer program instructions may also be stored in a computer-readable medium that can direct the processor to function in a particular manner.

The computer program instructions may be loaded onto the processor to cause a series of operational steps to be performed on the processor to produce a computer-implemented process such that the instructions which execute on the processor provide processes for implementing the functions/acts specified in the flowchart and/or block diagram block or blocks. The computer program product may form part of a system for providing a crowd entertainment system 100 with one or more ambience definitions in response to data pertaining to one or more crowd behaviour parameters received from the crowd entertainment system 100.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A crowd entertainment system, comprising:
    a set of devices for generating an ambience observable from a crowd location, said ambience comprising at least one of a visual effect and an audible effect; and
    a controller adapted to control said set of devices, the controller arranged to:
        either obtain data indicative of the behaviour of a crowd in said crowd location from at least one crowd behaviour capture device and obtain a crowd behaviour parameter from said data or obtain the crowd behaviour parameter from the at least one crowd behaviour capture device;
        obtain a crowd composition parameter indicative of a demographic composition of said crowd from a crowd composition parameter source;
        select an ambience definition from a plurality of ambience definitions as a function of the obtained crowd behaviour parameter and crowd composition parameter, each of said ambience definitions being labelled with at least one particular crowd composition parameter; and
        control at least a subset of said set of devices in accordance with the selected ambience definition.

2. The crowd entertainment system of claim 1, wherein the controller is arranged to obtain data pertaining to a plurality of individual behaviour parameters for a corresponding plurality of individuals within said crowd for said crowd location, and calculate the crowd behaviour parameter for said crowd location from the obtained plurality of individual behaviour parameters.

3. The crowd entertainment system of claim 2, wherein the controller is arranged to calculate the crowd behaviour parameter based on a correlation between the obtained plurality of individual behaviour parameters.

4. The crowd entertainment system of claim 1, wherein the controller is adapted to:
    compare the obtained crowd behaviour parameter against a defined threshold, wherein the crowd behaviour parameter expresses a score for at least one of (a) a synchronicity of crowd movement, (b) a level of crowd vocalization and (c) a type of crowd vocalization; and
    select an ambience definition having a particular crowd composition parameter matching the obtained crowd composition parameter from the plurality of ambience definitions if the obtained crowd behaviour parameter exceeds the defined threshold.

5. The crowd entertainment system of claim 1, wherein the crowd location comprises a plurality of sections, and wherein the controller is arranged to:
    for each section, obtain data pertaining to a crowd behaviour parameter indicative of the behaviour of a crowd for said section;
    evaluate the crowd behaviour parameters for said respective sections to select one of said sections; and
    obtain a crowd composition parameter indicative of a composition of said crowd for at least the selected section;
    wherein the controller is adapted to select an ambience definition labelled with a particular crowd composition parameter matching the crowd composition parameter corresponding to the selected section from the plurality of ambience definitions.

6. The crowd entertainment system of claim 5, wherein the controller is arranged to evaluate the crowd behaviour parameters for said respective sections by assigning a behavioural score to each of said sections, wherein the behavioural score is a score for at least one of (a) a synchronicity of crowd movement, (b) a level of crowd vocalization and (c) a type of crowd vocalization and selecting the section having the highest behavioural score.

7. The crowd entertainment system of claim 5, wherein each section is associated with at least one device of said set of devices.

8. The crowd entertainment system of claim 1, further comprising the at least one crowd behaviour capture device adapted to communicate with the controller.

9. The crowd entertainment system of claim 8, wherein the system comprises a plurality of said capture devices, wherein each capture device is a wearable capture device for wearing by an individual in the crowd.

10. An arena lighting system comprising a plurality of luminaires and the crowd entertainment system of claim 1, wherein the controller is adapted to control said luminaires, wherein at least some of the luminaires belong to said set of devices.

11. A computer-implemented method of selecting an ambience, the method comprising:
providing a crowd entertainment system comprising a set of devices for generating an ambience observable from a crowd location, said ambience comprising at least one of a visual effect and an audible effect; and a controller adapted to control said set of devices;
either obtaining, from said crowd entertainment system, data indicative of the behaviour of a crowd in said crowd location and obtaining a crowd behaviour parameter from said data, or obtain, from said crowd entertainment system, the crowd behaviour parameter;
obtaining a crowd composition parameter indicative of a demographic composition of said crowd;
selecting an ambience definition from a plurality of ambience definitions as a function of the obtained crowd behaviour parameter and the obtained crowd composition parameter; and
transmitting the selected ambience definition to the crowd entertainment system.

12. The computer-implemented method of claim 11, further comprising:
comparing the obtained crowd behaviour parameter against a defined threshold, wherein the crowd behaviour parameter expresses a score for at least one of (a) a synchronicity of crowd movement, (b) a level of crowd vocalization and (c) a type of crowd vocalization; and
selecting an ambience definition matching the obtained crowd composition parameter from the plurality of ambience definitions if the obtained crowd behaviour parameter exceeds the defined threshold.

13. The computer-implemented method of claim 11, wherein the crowd location comprises a plurality of sections, the method further comprising:
receiving for each section, from said crowd entertainment system, data pertaining to a crowd behaviour parameter indicative of the behaviour of a crowd for said section;
evaluating the crowd behaviour parameters for said respective sections to select one of said sections;
obtaining a crowd composition parameter indicative of a composition of said crowd at least for the selected section; and
selecting said ambience definition from the plurality of ambience definitions as a function of the crowd behaviour parameter and the crowd composition parameter corresponding to the selected section.

14. The computer-implemented method of claim 11, wherein receiving, from said crowd entertainment system, a crowd behaviour parameter indicative of the behaviour of a crowd in said crowd location comprises:
receiving data pertaining to a plurality of individual behaviour parameters corresponding to a plurality of individuals within said crowd from said crowd entertainment system, a combination of said plurality of individual behaviour parameters defining the crowd behaviour parameter; and
calculating the crowd behaviour parameter from the obtained plurality of individual behaviour parameters.

15. A non-transitory computer readable medium comprising program instructions embodied therein, the program instructions, when executed by a processor of a computer system, causing the processor to implement the method of claim 11.

* * * * *